(12) United States Patent
Bertero et al.

(10) Patent No.: US 9,047,880 B1
(45) Date of Patent: Jun. 2, 2015

(54) HEAT ASSISTED MAGNETIC RECORDING METHOD FOR MEDIA HAVING MOMENT KEEPER LAYER

(71) Applicant: WD Media, LLC, San Jose, CA (US)

(72) Inventors: Gerardo A. Bertero, Redwood City, CA (US); David Treves, Palo Alto, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/042,199

(22) Filed: Sep. 30, 2013

Related U.S. Application Data

(62) Division of application No. 13/332,290, filed on Dec. 20, 2011, now Pat. No. 8,565,050.

(51) Int. Cl.
    *G11B 11/00* (2006.01)
    *G11B 5/02* (2006.01)

(52) U.S. Cl.
    CPC ........................................ *G11B 5/02* (2013.01)

(58) Field of Classification Search
    CPC ............................................... G11B 2005/0032
    USPC .................................. 369/13.13, 13.33, 13.38
    See application file for complete search history.

(56) References Cited

U.S. PATENT DOCUMENTS

| | | | |
|---|---|---|---|
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |

(Continued)

FOREIGN PATENT DOCUMENTS

JP     2003085702     3/2003

OTHER PUBLICATIONS

Takenoiri et al., "Structural Control Method for Perpendicular Magnetic Recording Film," Fuji Electric Review, vol. 50, No. 3, pp. 81-84, 2004.

(Continued)

*Primary Examiner* — Tan X Dinh

(57) ABSTRACT

Systems and methods for providing media having a moment keeper layer for heat assisted magnetic recording (HAMR). One such method for writing information to a magnetic media having a moment keeper layer using heat assisted magnetic recording includes heating a portion of the media to a preselected temperature, where the media includes a magnetic recording layer adjacent to the keeper layer, where a Curie temperature of the keeper layer is greater than a Curie temperature of the recording layer, and where the preselected temperature is about equal to, or greater than, the Curie temperature of the recording layer, allowing the portion of the media to cool, and writing information to the media during the cooling.

11 Claims, 3 Drawing Sheets

(56) References Cited

U.S. PATENT DOCUMENTS

| | | |
|---|---|---|
| 6,200,673 B1 | 3/2001 | Miyamoto et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,388,956 B1 | 5/2002 | Mori et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,468,670 B1 | 10/2002 | Ikeda et al. |
| 6,482,330 B1 | 11/2002 | Bajorek |
| 6,482,505 B1 | 11/2002 | Bertero et al. |
| 6,495,252 B1 | 12/2002 | Richter et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,551,728 B1 | 4/2003 | Acharya et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,707,766 B2 | 3/2004 | Mori et al. |
| 6,730,420 B1 | 5/2004 | Bertero et al. |
| 6,743,528 B2 | 6/2004 | Suekane et al. |
| 6,754,020 B1 | 6/2004 | Hikosaka et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,834,026 B2 | 12/2004 | Fullerton et al. |
| 6,855,232 B2 | 2/2005 | Jairson et al. |
| 6,857,937 B2 | 2/2005 | Bajorek |
| 6,881,497 B2 | 4/2005 | Coffey et al. |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,950,260 B2 | 9/2005 | Coffey et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,060,375 B2 | 6/2006 | Lee et al. |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,582,368 B2 | 9/2009 | Berger et al. |
| 7,588,841 B2 | 9/2009 | Berger et al. |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,678,476 B2 | 3/2010 | Weller et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |

(56) References Cited

U.S. PATENT DOCUMENTS

| | | |
|---|---|---|
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,179,637 B2 | 5/2012 | Takeshita |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,416,646 B2 * | 4/2013 | Huang et al. ............... 369/13.01 |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B2 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2001/0051287 A1 | 12/2001 | Kikitsu et al. |
| 2002/0060883 A1 | 5/2002 | Suzuki |
| 2002/0192506 A1 * | 12/2002 | Coffey et al. .......... 428/694 TM |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0163962 A1 | 7/2005 | Kawato et al. |
| 2005/0167867 A1 | 8/2005 | Bajorek et al. |
| 2005/0263401 A1 | 12/2005 | Olsen et al. |
| 2006/0002026 A1 | 1/2006 | Stipe et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0026263 A1 * | 2/2007 | Kubota et al. ............... 428/832 |
| 2007/0070549 A1 | 3/2007 | Suzuki et al. |
| 2007/0245909 A1 | 10/2007 | Homola |
| 2008/0068748 A1 * | 3/2008 | Olson et al. ................... 360/110 |
| 2008/0075845 A1 | 3/2008 | Sonobe et al. |
| 2008/0093760 A1 | 4/2008 | Harper et al. |
| 2008/0226817 A1 | 9/2008 | Lee |
| 2009/0040644 A1 | 2/2009 | Lu et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0053811 A1 | 3/2010 | Takeshita |
| 2010/0110576 A1 * | 5/2010 | Akagi et al. .................... 360/59 |
| 2010/0110577 A1 | 5/2010 | Weller et al. |
| 2010/0143752 A1 | 6/2010 | Ishibashi et al. |
| 2010/0182714 A1 | 7/2010 | Kanbe et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0290148 A1 * | 11/2010 | Tawa et al. ..................... 360/59 |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |

(56) References Cited

U.S. PATENT DOCUMENTS

| | | |
|---|---|---|
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

OTHER PUBLICATIONS

Thiele et al., "Temperature Dependent Magnetic Properties of Highly Chemically Ordered Fe55-xNixPt45L1o Films," Journal of Applied Physics, vol. 91, No. 10, pp. 6595-6600, May 15, 2002.

Notice of Allowance dated Jun. 21, 2013 from U.S. Appl. No. 13/332,290 11 pages.

\* cited by examiner

HEAT ASSISTED MAGNETIC RECORDING METHOD FOR MEDIA HAVING MOMENT KEEPER LAYER

REFERENCE TO RELATED APPLICATIONS

This application is a divisional of U.S. patent application Ser. No. 13/332,290, filed on Dec. 20, 2011 entitled "SYSTEMS AND METHODS FOR PROVIDING MEDIA HAVING A MOMENT KEEPER LAYER FOR HEAT ASSISTED MAGNETIC RECORDING", the entire content of which is incorporated herein by reference.

FIELD

The present invention relates to magnetic recording technology, and more specifically to systems and methods for providing media having a moment keeper layer for heat assisted magnetic recording (HAMR).

BACKGROUND

To achieve high areal density for current magnetic storage drives, energy-assisted magnetic recording (EAMR) is commonly applied. In EAMR, the recording medium is locally heated to decrease the coercivity of the magnetic material during write operations. The local area is then rapidly cooled to retain the written information. This allows for magnetic write heads to be used with high coercivity magnetic materials. The heating of a local area may be accomplished by, for example, a heat or thermal source such as a laser. As such, one type of energy-assisted magnetic recording is heat assisted magnetic recording (HAMR).

Conventional HAMR media is typically composed of a substrate, a heat sink layer, seed and nucleation layers, and a magnetic recording layer. Desirable properties of the magnetic recording layer in HAMR media include a moderate Curie temperature and a uniform, well-segregated, high magnetic anisotropy grain structure with highly developed crystallographic texture. Writing to magnetic media in HAMR involves heating a localized area of the media to temperatures near or above the Curie temperature of the storage layer. This is done to locally lower the coercivity of the media. The direction of magnetization in the recorded bit is then set by an applied field. The recording process in HAMR media is important for defining the magnetization transitions. Sharp, well defined transitions are needed in order to achieve high recording linear densities. As such, an improved magnetic media for HAMR applications that can provide such well defined transitions to achieve the high recording linear densities is desirable.

SUMMARY

Aspects of the invention relate to systems and methods for providing media having a moment keeper layer for heat assisted magnetic recording. In one embodiment, the invention relates to a method for writing information to a magnetic media having a moment keeper layer using heat assisted magnetic recording, the method including heating a portion of the media to a preselected temperature, where the media includes a magnetic recording layer adjacent to the keeper layer, where a Curie temperature of the keeper layer is greater than a Curie temperature of the recording layer, and where the preselected temperature is about equal to, or greater than, the Curie temperature of the recording layer, allowing the portion of the media to cool, and writing information to the media during the cooling.

In another embodiment, the invention relates to a magnetic media for heat assisted magnetic recording, the magnetic media including a substrate, at least one intermediate layer on the substrate, a magnetic recording layer on the at least one intermediate layer, and a keeper layer on the at least one intermediate layer, where a Curie temperature of the keeper layer is greater than a Curie temperature of the recording layer, and where the keeper layer includes a one to one grain correspondence with the recording layer.

DETAILED DESCRIPTION

Figure 1:
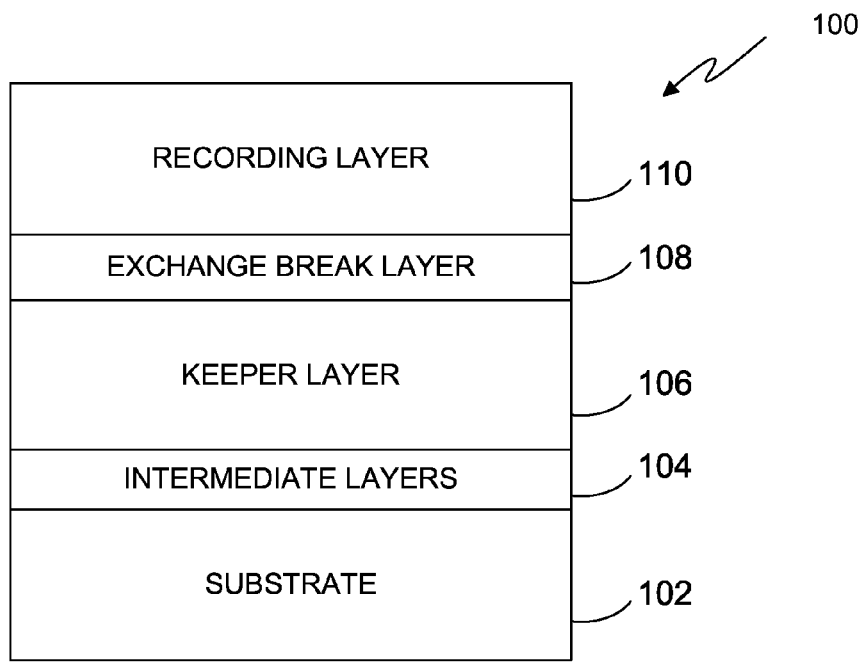
FIG. 1 is a side view of a magnetic media structure including a recording layer on a moment keeper layer for use with heat assisted magnetic recording in accordance with one embodiment of the invention.

Referring now to the drawings, embodiments of magnetic media including a moment keeper layer and processes for writing to the media are illustrated. The media include a recording or storage layer positioned on a substrate and the moment keeper layer positioned on the substrate where the Curie temperature of the keeper layer is greater than the Curie temperature of the recording layer. In several embodiments, the keeper layer has a one to one grain correspondence with the recording layer. In one embodiment, the recording layer is on the keeper layer. In another embodiment, the keeper layer is on the recording layer. In some embodiments, an exchange break layer is positioned between the recording layer and the keeper layer.

The processes for writing to the media include heating a portion of the media to a preselected temperature, allowing the portion of the media to cool, and writing information to the media during the cooling. In several embodiments, the magnetic anisotropy and magnetization of the keeper layer is greater than that of the recording layer at the preselected temperature. In a number of embodiments, the improved media and writing processes provide for high recording linear densities.

FIG. 1 is a side view of a magnetic media structure 100 including a recording layer 110 on a moment keeper layer 106 for use with heat assisted magnetic recording in accordance with one embodiment of the invention. The media structure 100 includes a stacked structure with a substrate 102 at a base of the stack, one or more intermediate layers 104 on the substrate 102, the keeper layer 106 on the intermediate layers 104, an exchange break layer 108 on the keeper layer 106, and the recording layer 110 on the exchange break layer 108. In some embodiments, the exchange break layer 108 is not used in the media structure 100.

The materials of the keeper layer 106 are selected such that the Curie temperature of the keeper layer 106 is greater than the Curie temperature of the recording layer 110. In one embodiment, for example, the keeper layer 106 is made of FeCo, FeCoNi. FePdCo, $Co_2XY(X:Cr, Mn, Fe, Nb, Y:Al, Ga, Sn)$, $Cu_2MnGa$, $Au_2MnAl$, CuMnAl, FeMoNi, $(FeCo)_2MnSi$, CoCrPt, FeCr, or another suitable material known in the art. In such case, the recording layer 110 is made of FePt, FeNiPt, FeCoPt, FeCuPt, FePtC, FePtAgC, or another suitable material known in the art. The EBL 108, intermediate layers 104, and substrate 102 can be made of suitable materials known in the art.

In a number of embodiments, the keeper layer 106 is configured to have a one to one grain correspondence with grains of the recording layer 110. In such case, the keeper layer 106 can provide for minimal or no intergranular/lateral exchange coupling while providing for strong vertical exchange coupling with the recording layer 110. In some embodiments, the keeper layer 106, in having the one to one grain correspondence, is effectively configured to substantially avoid or suppress lateral exchange coupling. In several embodiments, other beneficial effects associated with the one to one grain correspondence include better coercivity, lower noise during reading and writing, and as a consequence of the lower noise, higher signal to noise ratios. In several embodiments, the recording layer 110 has relatively high magnetic anisotropy (e.g., Ku).

In operation, an EAMR heat source such as a laser can heat a spot or portion of the media 100 to a preselected temperature that is about equal to, or greater than, the Curie temperature of the recording layer. As the media is heated, the coercivity of the recording layer 110 is lowered as well as the magnetization and magnetic anisotropy of the recording layer. Once the preselected temperature is reached, the media can be allowed to cool for a preselected time period or to cool to a preselected temperature. During the cooling process (e.g., refreeze process), information can be written to the media by applying a magnetic field.

While not bound by any particular theory, the purpose of the keeper layer 106 is to help orient (order) the magnetic moment of the recording/storage layer 110 grains during the refreeze process under the influence of the applied field when the magnetization of the recording layer 110 is very small as it cools from its Curie point. At that time, the magnetization of the keeper layer 106 is well defined and of higher magnitude compared to that of the recording layer 110 as it is further away from its own Curie point. With intergranular exchange coupling substantially suppressed in the keeper layer 106, the location of the transitions should be minimally influenced by the presence of the keeper layer 106. However, the transition sharpness should be enhanced by the presence of the keeper layer, thus improving the linear density capability of the system.

Figure 2:
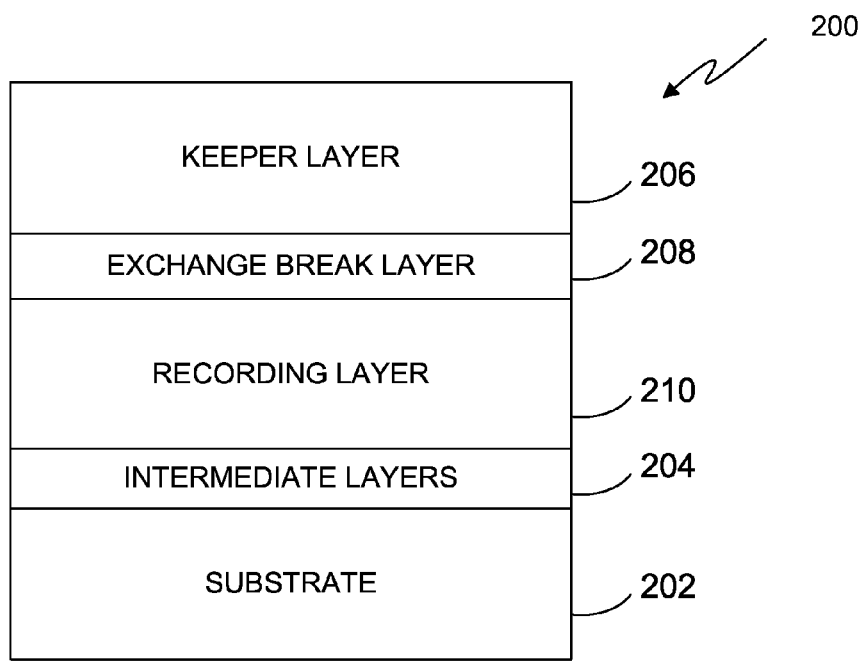
FIG. 2 is a side view of another magnetic media structure including a moment keeper layer on a recording layer for use with heat assisted magnetic recording in accordance with one embodiment of the invention.

FIG. 2 is a side view of another magnetic media structure 200 including a moment keeper layer 206 on a recording layer 210 for use with heat assisted magnetic recording in accordance with one embodiment of the invention. The media structure 200 includes a stacked structure with a substrate 202 at a base of the stack, one or more intermediate layers 204 on the substrate 202, the recording layer 210 on the intermediate layers 204, an exchange break layer 208 on the recording layer 210, and the keeper layer 206 on the exchange break layer 208. In some embodiments, the exchange break layer 208 is not used in the media structure 200. The materials of the keeper layer 206 are selected such that the Curie temperature of the keeper layer 206 is greater than the Curie temperature of the recording layer 210. In operation, the media 200 can perform and/or operate in the manner described above for the media 100 of FIG. 1. In several embodiments, the layers of the media structure 200 can be formed of the same materials as described above for the media 100 of FIG. 1.

Figure 3:
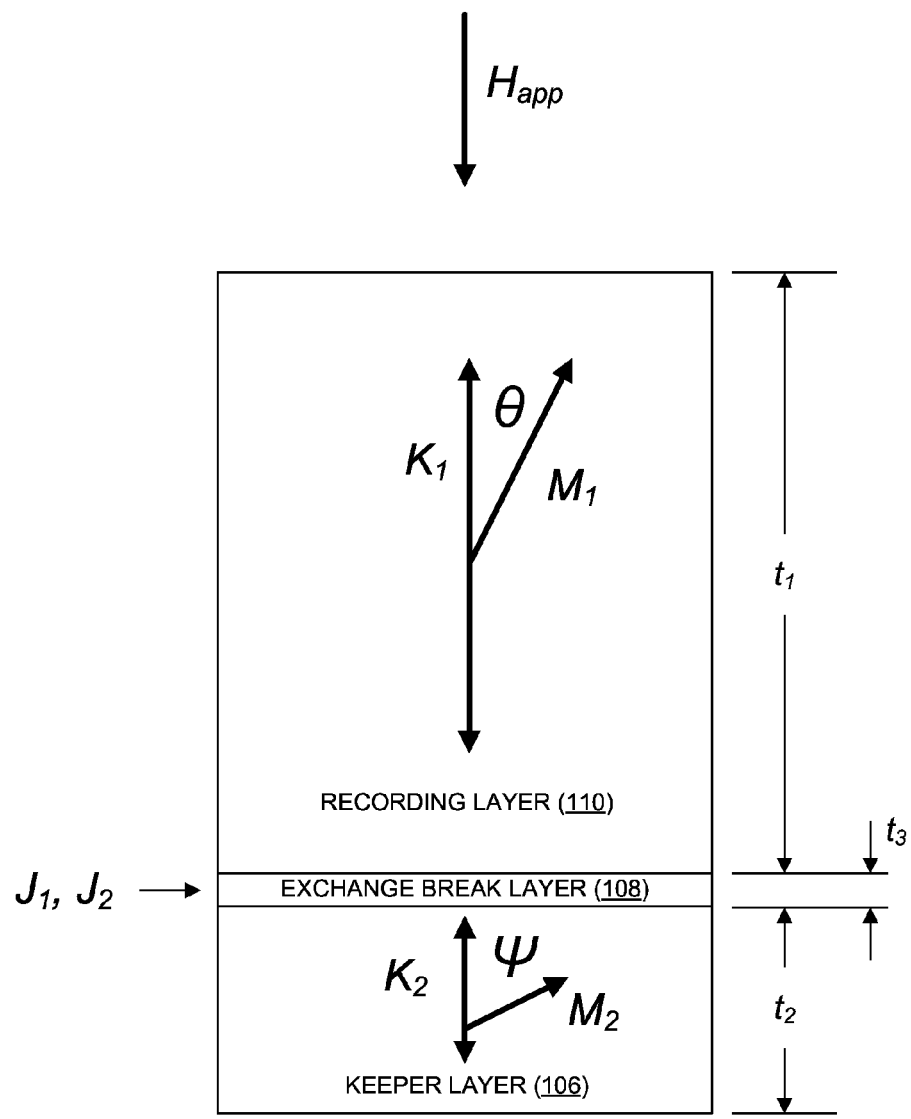
FIG. 3 is a side view of a single grain column of the magnetic media structure of FIG. 1 including the recording layer on the moment keeper layer for use with heat assisted magnetic recording in accordance with one embodiment of the invention.

FIG. 3 is a side view of a single grain column of the magnetic media structure of FIG. 1 including the recording layer 110 on the moment keeper layer 106 for use with heat assisted magnetic recording in accordance with one embodiment of the invention. While not bound by any particular theory, the total energy of the single grain column of FIG. 3 can be analyzed to get an idea of the magnitude of the effects being discussed. The hard recording layer (e.g., layer 1) 110 of the single grain column includes characteristics $K_1$, $M_1$ and $t_1$ which are the magneto-crystalline anisotropy energy, magnetization and thickness, respectively. Meanwhile, $K_2$, $M_2$ and $t_2$ are the corresponding values for the lower anisotropy keeper layer 106 (e.g., layer 2). The bilinear coupling constant, $J_1$, and bi-quadratic coupling constant, $J_2$, are interfacial exchange coupling constants mediated by the exchange break layer 108 of thickness $t_3$. Since the exchange break layer material would be typically be weakly magnetic or non-magnetic, $J_1$ and $J_2$ will be strong functions of $t_3$ decreasing in strength as $t_3$ increases. In the absence of an exchange break layer (EBL), $J_1$ and $J_2$ will correspond to fully exchange coupled layers, recording layer 110 and keeper layer 106.

Under the influence of an applied field H ($H_{app}$), the total energy of the system is given by adding the contributions from the magneto-crystalline energy and Zeeman energy terms for the recording layer 110 and the keeper layer 106 and the interfacial energy terms provided by the EBL 108.

$$E = K_1 \cdot t_1 \cdot \operatorname{Sin}^2(\theta) + K_2 \cdot t_2 \cdot \operatorname{Sin}^2(\psi) - H \cdot M_1 \operatorname{Cos}(\theta) - H \cdot M_2 \operatorname{Cos}(\psi) - J_1 \cdot \operatorname{Cos}(\psi - \theta) - J_2 \cdot \operatorname{Cos}^2(\psi - \theta)$$

The presence of the keeper layer 106 helps to order the magnetization of the recording layer 110 during the refreeze process under the influence of the applied field H. As stated previously, the Curie temperature for the keeper layer 106 is higher than that of the recording layer 110, and therefore it is expected that $M_2$ will be much higher than $M_1$ at the moment of writing. For a given thickness $t_3$, the magnitude of $J_1$ and $J_2$ will depend on $M_1$, $M_2$ and temperature (T). Typical interfacial energy values for $J_1$ at room temperature range from about 0.2 to 10 erg/cm$^2$ corresponding to effective fields of a few hundred to a few thousand Oe. The bi-quadratic coupling energy $J_2$ is normally half to one order of magnitude smaller than $J_1$.

Phenomenologically, the magneto-crystalline anisotropy will be a function of temperature. Normally it is expressed as:

$$\frac{K_1(T)}{K_1(T_0)} = \left[\frac{M_s(T)}{M_s(T_0)}\right]^n$$

The value of the exponent, n, is experimentally found to be between about 1.5 and 3 for magnetic materials with uni-axial anisotropy. This relation should apply to the recording layer and the keeper layer but not necessarily with the same exponent n.

For fully $L1_0$ ordered FePt, $K_1(T_0)$ provides about $4.5 \times 10^7$ erg/cc and $M_1$ is about 1125 emu/cm$^3$. At the Curie temperature for this material, approximately 770K, both $K_1$ and $M_1$ vanish. The expected applied field H magnitude in a HAMR application is about 0.5 to 1.5 Tesla.

The value of $K_2$ should be such that it is easily switchable magnetically by the applied field H at the writing temperature but high enough to keep $M_2$ perpendicular in the media at remanence at room temperature (K2 will depend on the value of interfacial exchange $J_{1,2}$ and $M_2$ among other parameters). $M_2$ should also be as high as possible at the writing temperature. This generally requires that the Curie point of the keeper layer material be significantly higher than that of the recording layer. Thus, it is expected that during magnetization refreeze, the exchange energy exerted by the keeper layer on the recording layer can significant in assisting the ferromagnetic ordering and switching of the magnetic grains in the recording layer.

Figure 4:
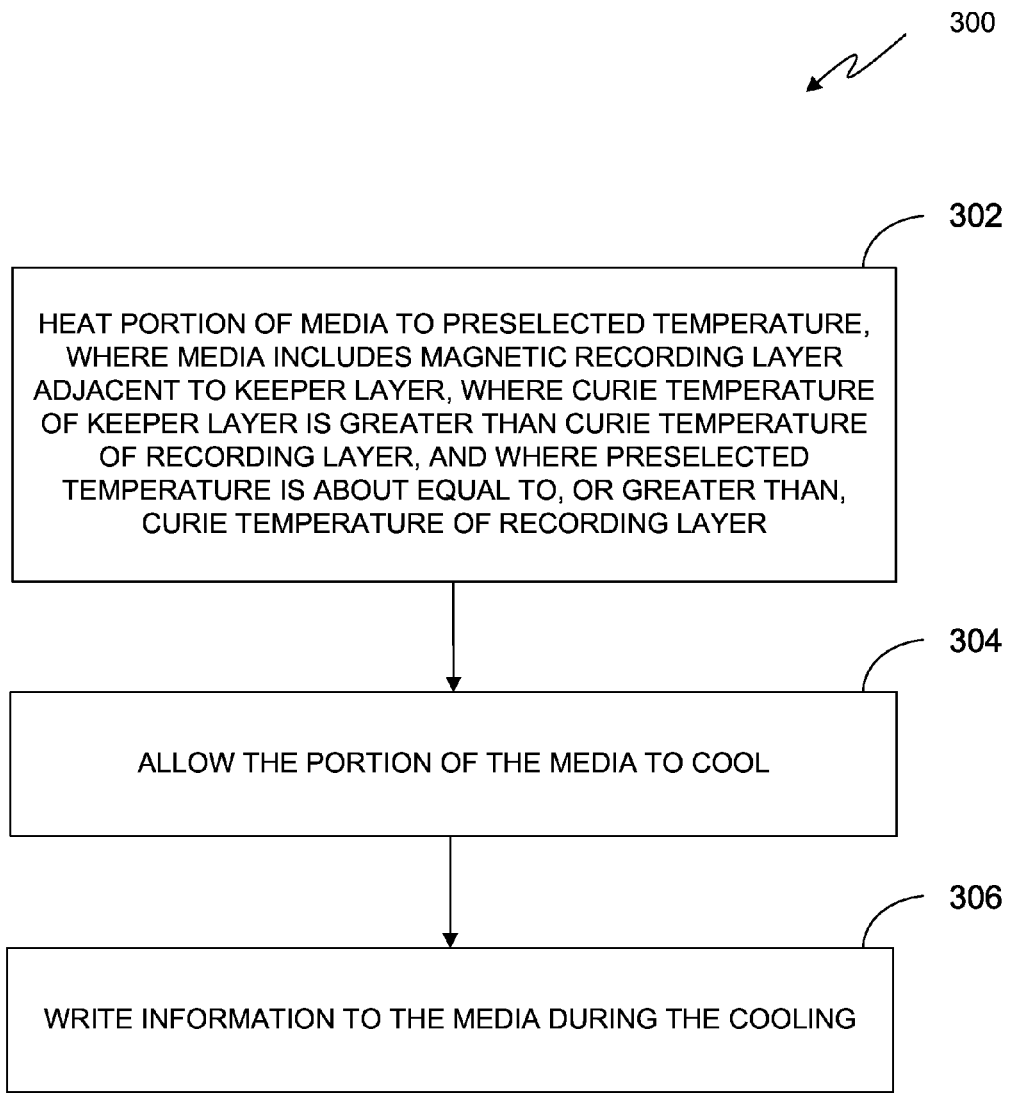
FIG. 4 is a flowchart of a process for writing information to a magnetic media structure including a moment keeper layer for use with heat assisted magnetic recording in accordance with one embodiment of the invention.

FIG. 4 is a flowchart of a process 300 for writing information to a magnetic media structure including a moment keeper layer for use with heat assisted magnetic recording in accordance with one embodiment of the invention. In particular embodiments, the process 300 can be used in conjunction with the media structures of FIGS. 1-3. The process first heats (302) a portion of the media to a preselected temperature, where the media includes a magnetic recording layer adjacent to the keeper layer, where a Curie temperature of the keeper layer is greater than a Curie temperature of the recording layer, and where the preselected temperature is about equal to, or greater than, the Curie temperature of the recording layer. The process then allows (304) the portion of the media to cool. The process then writes (306) information to the media during the cooling.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In several of the figures, components appear to have particular dimensions. However, the components are not drawn to scale and can have other suitable dimensions in other embodiments.

What is claimed is:

1. A method for writing information to a magnetic media having a moment keeper layer using heat assisted magnetic recording (HAMR), the method comprising:
   heating a portion of the media to a preselected temperature, wherein the media comprises a magnetic recording layer adjacent to the keeper layer, wherein a Curie temperature of the keeper layer is greater than a Curie temperature of the recording layer, and wherein the preselected temperature is about equal to, or greater than, the Curie temperature of the recording layer;
   allowing the portion of the media to cool; and
   writing information to the media during the cooling,
   wherein the keeper layer is configured to orient a magnetic moment of grains of the magnetic recording layer when a magnetic recording field is applied to the media.

2. The method of claim 1, wherein a magnetic anisotropy of the keeper layer is greater than a magnetic anisotropy of the recording layer at the preselected temperature.

3. The method of claim 1, wherein a magnetization of the keeper layer is greater than a magnetization of the recording layer at the preselected temperature.

4. The method of claim 1, wherein the keeper layer comprises a one to one grain correspondence with the recording layer.

5. The method of claim 1, wherein a lateral exchange coupling between grains of the keeper layer is substantially suppressed.

6. The method of claim 1, wherein the media comprises a vertical exchange coupling between grains of the keeper layer and grains of the recording layer.

7. The method of claim 1, wherein the recording layer is on the keeper layer.

8. The method of claim 1, wherein the keeper layer is on the recording layer.

9. The method of claim 1, further comprising an exchange break layer positioned between the keeper layer and the recording layer.

10. The method of claim 1, wherein the preselected temperature is less than the Curie temperature of the keeper layer.

11. The method of claim 1, wherein the writing the information to the media during the cooling comprises writing the information to the media during a refreeze process of the media.

* * * * *